US008762972B2

(12) United States Patent
Nikara et al.

(10) Patent No.: US 8,762,972 B2
(45) Date of Patent: Jun. 24, 2014

(54) METHODS AND APPARATUSES FOR FACILITATING EXECUTION OF APPLICATIONS REQUIRING RUNTIME COMPILATION

(75) Inventors: Jari Nikara, Lempäälä (FI); Eero Aho, Tampere (FI)

(73) Assignee: Nokia Corporation, Espoo (FI)

( * ) Notice: Subject to any disclaimer, the term of this patent is extended or adjusted under 35 U.S.C. 154(b) by 635 days.

(21) Appl. No.: 13/023,245

(22) Filed: Feb. 8, 2011

(65) Prior Publication Data
US 2012/0204162 A1 Aug. 9, 2012

(51) Int. Cl.
*G06F 9/45* (2006.01)

(52) U.S. Cl.
USPC ............ 717/148; 717/139; 717/140; 717/153

(58) Field of Classification Search
None
See application file for complete search history.

(56) References Cited

U.S. PATENT DOCUMENTS

| 5,381,547 | A | * | 1/1995 | Flug et al. | 719/331 |
| 5,465,258 | A | * | 11/1995 | Adams | 717/128 |
| 5,956,507 | A | * | 9/1999 | Shearer et al. | 718/104 |
| 5,960,197 | A | * | 9/1999 | Segnan | 717/116 |
| 5,991,763 | A | * | 11/1999 | Long et al. | 1/1 |
| 6,026,240 | A | * | 2/2000 | Subramanian | 717/161 |
| 6,298,481 | B1 | * | 10/2001 | Kosaka et al. | 717/110 |
| 6,370,687 | B1 | | 4/2002 | Shimura | |
| 2003/0005425 | A1 | | 1/2003 | Zee | |
| 2003/0131147 | A1 | * | 7/2003 | Wilt et al. | 709/321 |
| 2005/0136939 | A1 | | 6/2005 | Mountain et al. | |
| 2007/0294681 | A1 | * | 12/2007 | Tuck et al. | 717/149 |
| 2008/0127134 | A1 | * | 5/2008 | Tirumalai et al. | 717/140 |
| 2008/0276262 | A1 | * | 11/2008 | Munshi et al. | 719/328 |
| 2009/0024986 | A1 | | 1/2009 | Meijer et al. | |
| 2009/0089563 | A1 | * | 4/2009 | Cabillic et al. | 712/228 |
| 2011/0034176 | A1 | * | 2/2011 | Lord et al. | 455/450 |

(Continued)

FOREIGN PATENT DOCUMENTS

| EP | 0 930 567 A2 | 7/1999 |
| EP | 1 347 379 A2 | 9/2003 |
| WO | WO 00/41075 A2 | 7/2000 |

OTHER PUBLICATIONS

The Khronos Group—a non-profit industry consortium to develop, publish and promote open standard, royalty-free media authoring and acceleration standards for desktop and handheld devices, combined with conformance qualification programs for platform and device interoperability [online] [retrieved Feb. 18, 2011]. Retrieved from the Internet: <URL: http://www.khronos.org/opencl/>. 6 pages.

(Continued)

*Primary Examiner* — Chameli Das
(74) *Attorney, Agent, or Firm* — Alston & Bird LLP

(57) ABSTRACT

Methods and apparatuses are provided for facilitating execution of kernels requiring runtime compilation. A method may include implementing a driver for a framework for handling kernels requiring runtime compilation. The method may further include receiving, by the driver, code for a kernel requiring at least partial runtime compilation for execution using the framework. The method may additionally include obtaining, by the driver, a compiled executable version of the kernel. The obtained compiled executable version of the kernel may not have been locally compiled. The method may also include causing, by the driver, the compiled executable version of the kernel to be provided for execution. Corresponding apparatuses are also provided.

18 Claims, 10 Drawing Sheets

(56) References Cited

U.S. PATENT DOCUMENTS

| | | | | |
|---|---|---|---|---|
| 2011/0035737 | A1* | 2/2011 | Stefansson et al. | 717/149 |
| 2011/0088022 | A1* | 4/2011 | Kruglick | 717/153 |
| 2011/0209128 | A1 | 8/2011 | Nikara et al. | |
| 2012/0124563 | A1* | 5/2012 | Chung et al. | 717/140 |
| 2012/0258776 | A1* | 10/2012 | Lord et al. | 455/556.1 |
| 2013/0117305 | A1* | 5/2013 | Varakin et al. | 707/769 |
| 2013/0191816 | A1* | 7/2013 | Zhang et al. | 717/140 |

OTHER PUBLICATIONS

OpenCL Reference Pages [online] [retrieved Feb. 18, 2011]. Retrieved from the Internet: <URL: http://www.khronos.org/registry/cl/sdk/1.1/docs/man/xhtml/oclRefPages-Title.html>. 1 page.

The OpenCL Specification, Version: 1.1; Document Revision: 36, Khronos OpenCL Working Group, (2010), 379 pages.

International Search Report and Written Opinion from International Application No. PCT/FI2012/050066, mailed Jun. 19, 2012.

Wikipedia: "Open CL", Jan. 31, 2011; http://en.wikipedia.org/w/index.php?title=OpenCL&oldid=411121854.

Wikipedia: "Java class file", Jan. 2, 2011, http://en.wikipedia.org/w/index.php?title=Java_class_file&oldid=405526995.

Koshy, J., et al.; "Balancing Computation and Communication Costs: The Case of Hybrid Execution in Sensor Networks", 2007, pp. 1185-1200, Ad Hoc Networks 6 (2008), Elsevier.

Delsart B., et al; "JCOD: A Lightweight Modular Compilation Technology for Embedded Java", 2002, pp. 197-212, EMSOFT 2002, LNCS 2491, Spreinger-Verlag.

Chen G.; "Studying Energy Trade Offs in Offloading Computation/Compilation in Java-Enabled Mobile Devices", 2004, pp. 795-809, IEEE Transactions on Parallel and Distributed Systems, vol. 15, No. 9, Sep. 2004.

* cited by examiner

```
 1  cl_int clBuildProgram (cl_program program,
 2                         cl_uint num_devices,
 3                         const cl_device_id *device_list,
 4                         const char *options,
 5                         void (CL_CALLBACK *pfn_notify)(cl_program program,
 6                                                        void *user_data),
 7                         void *user_data) {
 8      //If there is call back -function, return immediately and call
 9      //the call back -funcktion when the build has completed
10      if (pfn_notify != null) {
11          makeCallBack(pfn_notify, program, user_data);
12          return CL_SUCCESS;
13      }
14
15      //Check if the acquired program binaries are in cache
16      int binary_found_count = 0;
17      while (dev_i < num_devices) {
18          while (i < cache_program_count) {
19              if ((cache->program(i).info.source == program.info.source) &&
20                  (cache->program(i).info.XXX == program.info.XXX )){
21                  //Program may contain binaries for several devices
22                  while ((cache_dev_i < cache->program(i).info.device_count){
23                      if ((cache->program(i).info.device(cache_dev_i) == program.info.device(dev_i)) {
24                          program.info.binary(dev_i) = cache->program(i).info.binary(cache_dev_i);
25                          program.info.binarySize(dev_i) = cache->program(i).info.binarySize(cache_dev_i);
26                          program.info.YYY(dev_i) = cache->program(i).info.YYY(cache_dev_i);
27                          program_found_count += 1;
28                      }
29                  }
30              }
31          }
32      }
33      if (binary_found_count == num_devices) return CL_SUCCESS;
34
35      if (networkConnectionAvailable) {
36          rsp_compile = sendCompileReq(MOBILE_TERMINAL_META_DATA, program, num_devices, *device_list, *options);
37          if (rsp_compile == SUCCESS) {
38              while (dev_i < num_devices){
39                  program.info.binary(dev_i) = getBinary(dev_i);
40                  program.info.binarySize(dev_i) = getBinarySize(dev_i);
41                  program.info.YYY(dev_i) = getYYY(dev_i);
42                  compilation_status(dev_i) = getCompilationStatus(dev_i);
43              }
44              putProgramToCache(program);
45          }
46          return defineClBuildProgramStatus(program, compilation_status);
47      } else {
48          return CL_COMPILER_NOT_AVAILABLE;
49      }
50  }
```

FIG. 7

METHODS AND APPARATUSES FOR FACILITATING EXECUTION OF APPLICATIONS REQUIRING RUNTIME COMPILATION

TECHNOLOGICAL FIELD

Example embodiments of the present invention relate generally to computing technology and, more particularly, relate to methods and apparatuses for facilitating execution of applications requiring runtime compilation.

BACKGROUND

The modern computing era has brought about a tremendous expansion in computing power as well as increased portability and affordability of computing devices. This expansion has resulted in a wide variety of computing platforms being used by consumers from all walks of life in their everyday lives. These computing platforms have a wide variety of hardware and software configurations, each of which may present a unique execution platform for software applications. Accordingly, a software application developed for one execution platform may not function properly when executed on a second execution platform.

A simultaneous ongoing trend is that end user applications are increasingly moving to the web. A variety of previously mentioned computing platforms are often used to access the web, including web-based applications. It may be impractical for web developers to generate a set of executable versions of an application including an executable version for each computing platform that may be used to access the application. Accordingly, a web developer may distribute a web application as source code requiring interpretation or runtime compilation.

BRIEF SUMMARY

Systems, methods, apparatuses, and computer program products are herein provided for facilitating execution of applications requiring runtime compilation. Systems, methods, apparatuses, and computer program products in accordance with various example embodiments may provide several advantages to computing devices, computing device users, application developers, and application distributors. In this regard, some example embodiments provide a driver for a framework configured to handle kernels requiring runtime compilation. In this regard, a kernel may comprise a portion or component of a larger application. A kernel may, for example, comprise a computationally intensive portion of an application, such as computation functions included in an application that may be described in a language, such as Open Computing Language™. A driver in accordance with some example embodiments may be implemented on an apparatus that does not include a compiler for the framework or on an apparatus that does not include a full compiler for the framework. The driver of some such example embodiments may leverage a remote compiler, which may be implemented in thin client mode. Embodiments utilizing a remote compiler may advantageously extend support for runtime compilation of applications so as to enable execution of such applications even on devices that may not include a compiler.

In a first example embodiment, a method is provided, which comprises implementing a driver for a framework configured to handle kernels requiring runtime compilation. The method of this example embodiment further comprises receiving, by the driver, code for a kernel requiring runtime compilation for execution using the framework. The method of this example embodiment additionally comprises obtaining, by the driver, a compiled executable version of the kernel. The compiled executable version of the kernel obtained in this example embodiment was not locally compiled. The method of this example embodiment also comprises causing, by the driver, the compiled executable version of the kernel to be provided for execution.

In another example embodiment, an apparatus comprising at least one processor and at least one memory storing computer program code is provided. The at least one memory and stored computer program code are configured, with the at least one processor, to cause the apparatus of this example embodiment to at least implement a driver for a framework configured to handle kernels requiring runtime compilation. The at least one memory and stored computer program code are configured, with the at least one processor, to further cause the apparatus of this example embodiment to receive, by the driver, code for a kernel requiring at least partial runtime compilation for execution using the framework. The at least one memory and stored computer program code are configured, with the at least one processor, to additionally cause the apparatus of this example embodiment to obtain, by the driver, a compiled executable version of the kernel. The compiled executable version of the kernel obtained in this example embodiment was not locally compiled on the apparatus. The at least one memory and stored computer program code are configured, with the at least one processor, to also cause the apparatus of this example embodiment to cause, by the driver, the compiled executable version of the kernel to be provided for execution.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method. The method of this example embodiment comprises implementing a driver for a framework configured to handle kernels requiring runtime compilation. The method of this example embodiment further comprises receiving, by the driver, code for a kernel requiring at least partial runtime compilation for execution using the framework. The method of this example embodiment additionally comprises obtaining, by the driver, a compiled executable version of the kernel. The compiled executable version of the kernel obtained in this example embodiment was not locally compiled. The method of this example embodiment also comprises causing, by the driver, the compiled executable version of the kernel to be provided for execution.

In another example embodiment, an apparatus is provided that comprises means for implementing a driver for a framework configured to handle kernels requiring runtime compilation. The apparatus of this example embodiment further comprises means for receiving, by the driver, code for a kernel requiring at least partial runtime compilation for execution using the framework. The apparatus of this example embodiment additionally comprises means for obtaining, by the driver, a compiled executable version of the kernel. The compiled executable version of the kernel obtained in this example embodiment was not locally compiled on the apparatus. The apparatus of this example embodiment also comprises means for causing, by the driver, the compiled executable version of the kernel to be provided for execution.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

FIG. 7 illustrates a pseudo code representation of an implementation of a build program function in accordance with some example embodiments;

DETAILED DESCRIPTION

Figure 1:
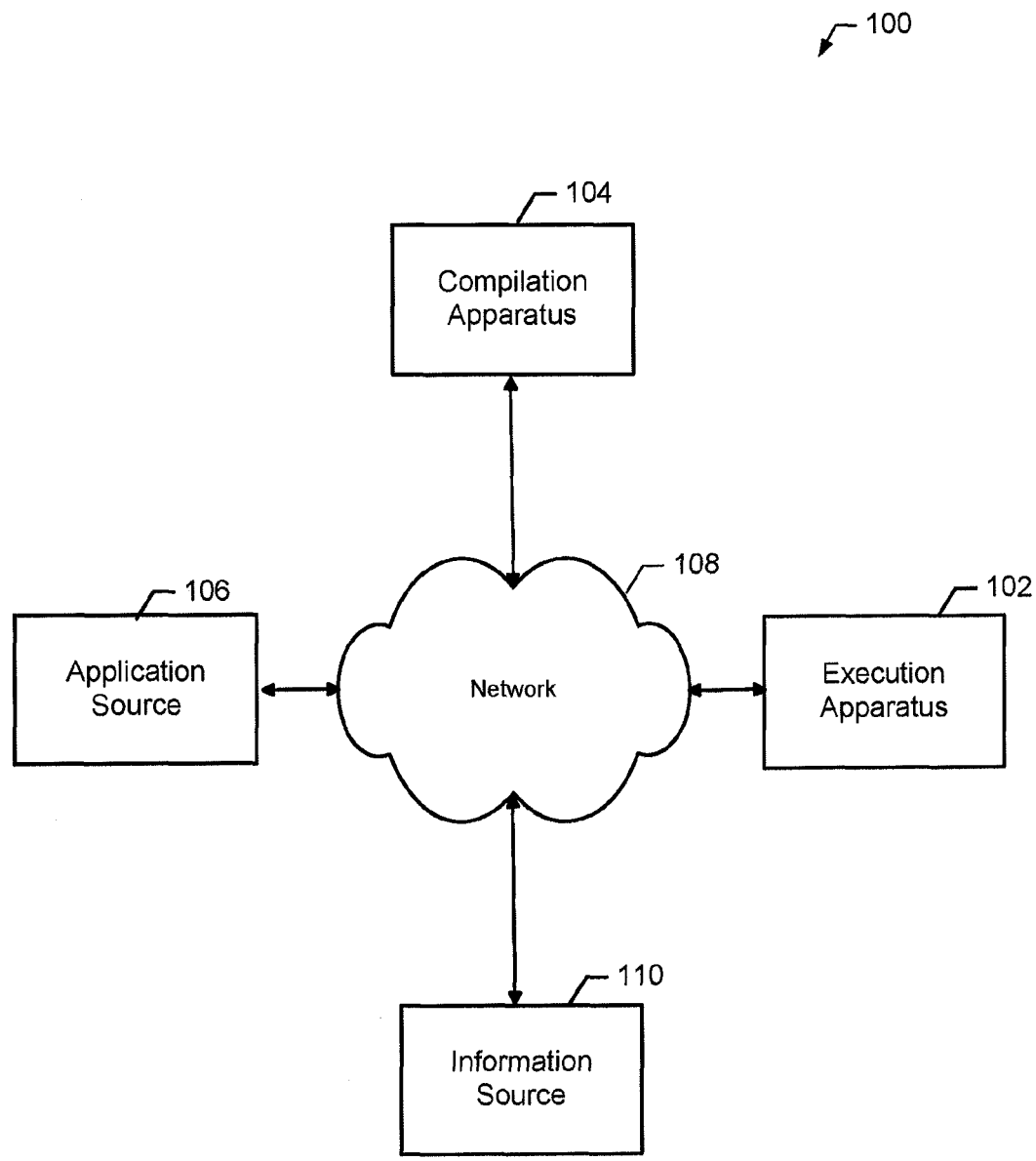
FIG. 1 illustrates a system for facilitating execution of application requiring runtime compilation according to an example embodiment.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Compilation of an application is a processing intensive task, especially for a mobile device, which may have more limited computing resources when compared with a personal computer. However, runtime compilation must be performed relatively quickly in order to provide a quality end-user experience. Open Computing Language (OpenCL™) kernel compilation requires a significant amount of time compared to execution, even when performed on modern powerful state-of-the art personal computers. Compilation may additionally be a quite power intensive operation, which may result in significant battery drain when performed on mobile devices. Further, in order to obtain a good and power efficient end result, the compilation may require performance of analysis and optimization operations that may impose an even heavier computing load. As such, there might be insufficient computing resources to support runtime compilation in many mobile devices.

Further, many mobile computing devices do not include platform-specific, in-device compilers. While OpenCL does require an OpenCL compiler, the OpenCL embedded profile does not require it. However, OpenCL embedded profile does not provide a working approach for WebCL, which provides an interpreted computer programming language (e.g. JavaScript™) application programming interface (API) including OpenCL API bindings to manage processing of kernels described using OpenCL C programming language, so as to enable usage of OpenCL kernels in web content. Web applications may include kernels, which may require runtime compilation in order to achieve good portability. In this regard, precompilation of the kernels of web applications may not be feasible given the large number of platform variations accessing the web. In this regard, a quality user experience may require that a web application works on all devices. Accordingly, runtime compilation of a kernel may be required given the impracticality of anticipating what platforms will be used to access and execute a web application and providing a targeted compiled executable version of the kernel for each of the platforms.

Referring now to FIG. 1, FIG. 1 illustrates a block diagram of a system 100 for a system for facilitating execution of applications requiring runtime compilation according to an example embodiment. In this regard, some example embodiments of the system of FIG. 1 may facilitate execution of applications including kernels, or components, requiring compilation. Such kernels may, for example, comprise computational portions of an application, which may, for example, be described in a language, such as Open Computing Language™. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for a system for facilitating execution of applications requiring runtime compilation, numerous other configurations may also be used to implement embodiments of the present invention.

The system 100 may include one or more execution apparatuses 102. An execution apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. In this regard, the execution apparatus 102 may comprise any computing device providing a platform for execution of an application and/or a portion thereof (e.g., a kernel), such as with the facilitation of a driver implemented in accordance with one or more embodiments disclosed herein.

The system 100 may further comprise one or more compilation apparatuses 104. A compilation apparatus 104 may be embodied as one or more servers, a server cluster, a cloud computing infrastructure, one or more desktop computers, one or more laptop computers, one or more mobile computers, one or more network nodes, multiple computing devices in communication with each other, a chipset, an apparatus comprising a chipset, any combination thereof, and/or the like. More particularly, an compilation apparatus 104 may be embodied as any computing device implementing a compiler configured to compile a kernel and provide the kernel to the execution apparatus 102 to enable execution of the kernel by the execution apparatus 102, as will be described further herein below.

In some example embodiments, an execution apparatus 102 and compilation apparatus 104 may be configured to communicate via the network 108. For example, the execution apparatus 102 may send source code for a kernel to the compilation apparatus 104 over the network 108 for compilation by the compilation apparatus 104. The compilation apparatus 104 may send a compiled executable version of the kernel to the execution apparatus 102 over the network 108. The network 108 may comprise one or more wireless networks (for example, a cellular network, wireless local area network, wireless personal area network, wireless metropolitan area network, and/or the like), one or more wireline networks, or some combination thereof, and in some embodiments comprises at least a portion of the internet.

The system 100 may further comprise one or more application sources 106. An application source 106 may be embodied as one or more servers, a server cluster, a cloud computing infrastructure, one or more desktop computers, one or more laptop computers, one or more mobile computers, one or more network nodes, multiple computing devices in communication with each other, a chipset, an apparatus comprising a chipset, any combination thereof, and/or the like. More particularly, an application source 106 may comprise any computing device that may send an application, a kernel, source code for a kernel, and/or the like to an execution apparatus 102, such as in response to a request by the execution apparatus 102. In some example embodiments, an application source 106 may be embodied as a web server. Although illustrated as separate entities, in some example embodiments, an application source 106 and a compilation apparatus 104 may be co-located.

The system 100 may further comprise one or more information sources 110 from which the compilation apparatus 104 may obtain information about an execution platform of an execution apparatus 102 to enable the compilation apparatus 104 to compile source code to generate a compiled executable targeted for execution on an execution platform of a given execution apparatus 102. An information source 110 may accordingly comprise any computing device configured to store and/or provide information about an execution apparatus 102, a user of an execution apparatus 102, a service used by an execution apparatus 102, a software configuration of an execution apparatus 102, a hardware configuration of an execution apparatus 102, network capabilities of a network used by the execution apparatus 102, and/or the like.

Figure 2:
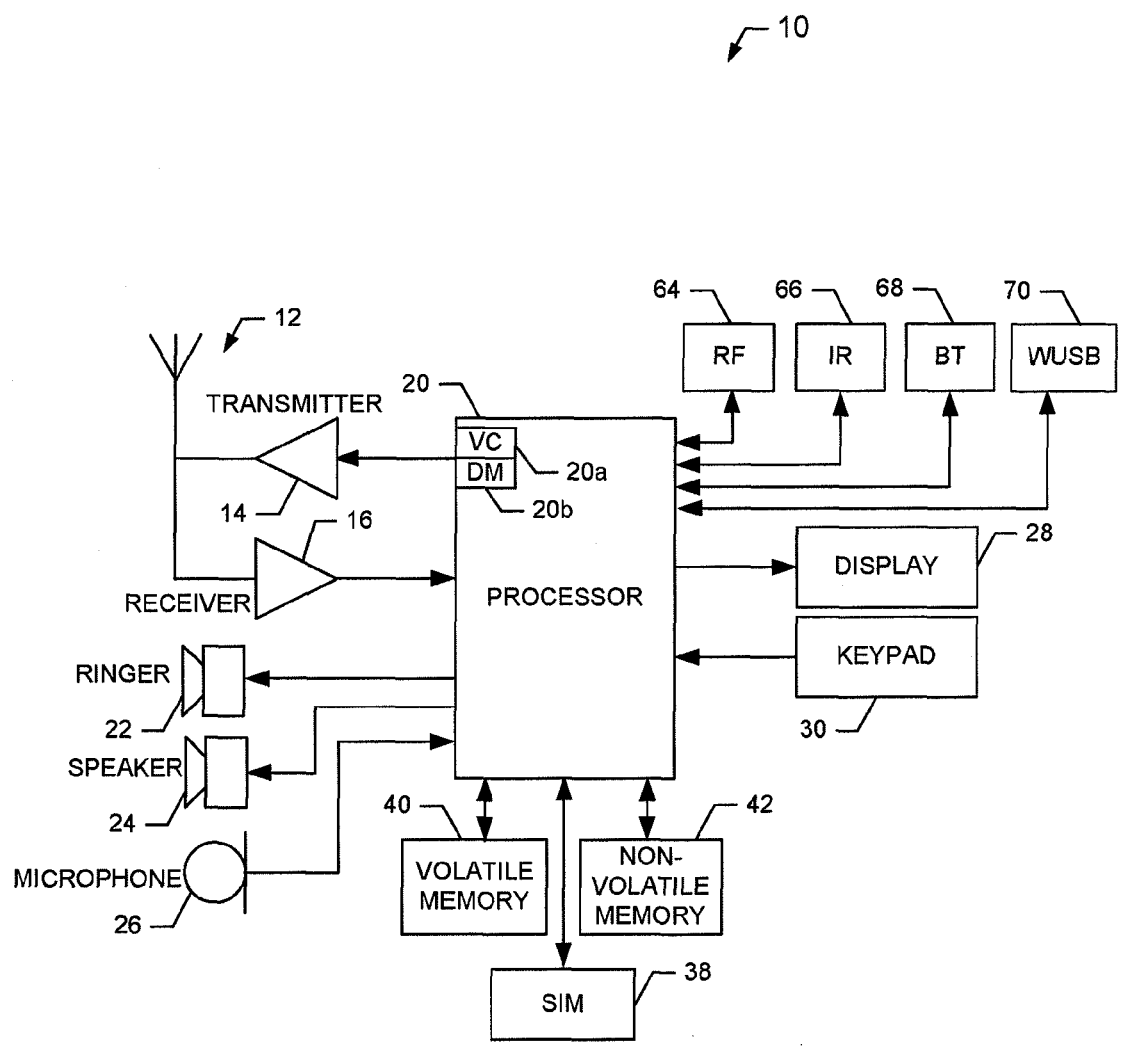
FIG. 2 is a schematic block diagram of a mobile terminal according to an example embodiment.

In an example embodiment, the execution apparatus 102 is embodied as a mobile terminal, such as that illustrated in FIG. 2. In this regard, FIG. 2 illustrates a block diagram of a mobile terminal 10 representative of one embodiment of an execution apparatus 102. It should be understood, however, that the mobile terminal 10 illustrated and hereinafter described is merely illustrative of one type of execution apparatus 102 that may implement and/or benefit from various example embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
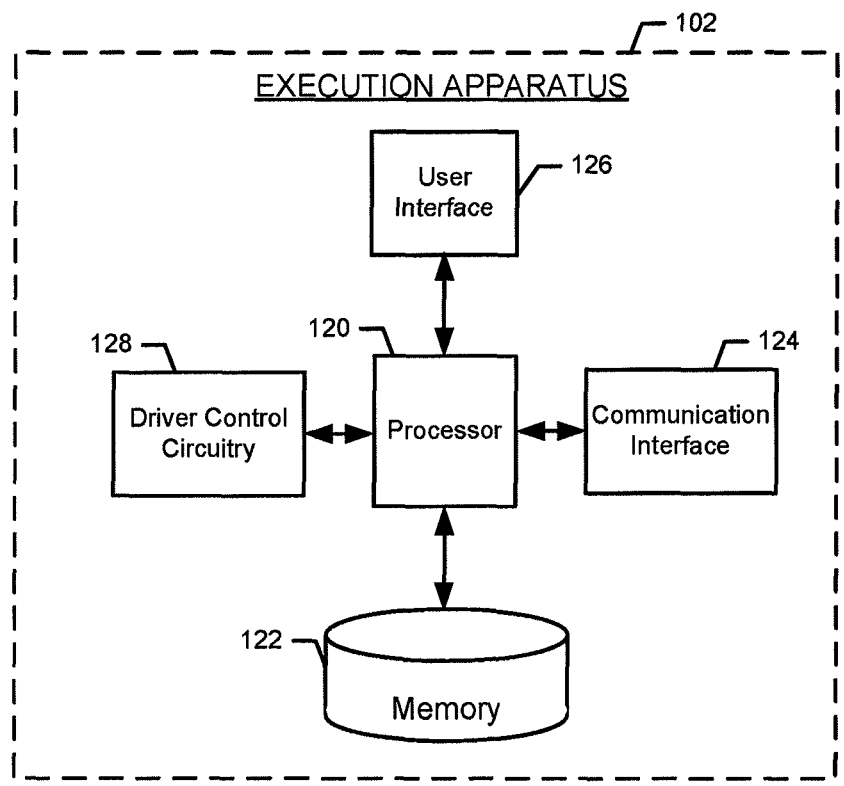
FIG. 3 illustrates a block diagram of an execution apparatus according to an example embodiment.

Referring now to FIG. 3, FIG. 3 illustrates a more detailed block diagram of an execution apparatus 102 according to an example embodiment. In the example embodiment, the execution apparatus 102 includes various means for performing the various functions herein described. These means may comprise one or more of a processor 120, memory 122, communication interface 124, user interface 126, or driver control circuitry 128. The means of the execution apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 3 may be embodied as a chip or chip set. In other words, the execution apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, and/or driver control circuitry 128 may be embodied as a chip or chip set. The execution apparatus 102 may therefore, in some example embodiments, be configured to implement embodiments of the present invention on a single chip or as a single "system on a chip." As another example, in some example embodiments, the execution apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 120 comprises a plurality of processors. The plurality of processors may be in operative communication with each other and may be collectively configured to perform one or more functionalities of the execution apparatus 102 as described herein. The plurality of processors may be embodied on a single computing device or distributed across a plurality of computing devices collectively configured to function as the execution apparatus 102. In embodiments wherein the execution apparatus 102 is embodied as a mobile terminal 10, the processor 120 may be embodied as or comprise the processor 20. In some example embodiments, the processor 120 is configured to execute instructions stored in the memory 122 or otherwise accessible to the processor 120. These instructions, when executed by the processor 120, may cause the execution apparatus 102 to perform one or more of the functionalities of the execution apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the execution apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the execution apparatus 102 is embodied as a mobile terminal 10, the memory 122 may comprise the volatile memory 40 and/or the non-volatile memory 42. The memory 122 may be configured to store information, data, applications, instructions, or the like for enabling the execution apparatus 102 to carry out various functions in accordance with various example embodiments.

For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the driver control circuitry 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the execution apparatus 102 and one or more computing devices or computing resources may be in communication. As an example, the communication interface 124 may be configured to enable communication between the execution apparatus 102 and the compilation apparatus 104 over a network (for example, the network 108). The communication interface 124 may additionally be in communication with the memory 122, user interface 126, and/or driver control circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the user interface 126 comprises a touch screen display, the user interface 126 may additionally be configured to detect and/or receive an indication of a touch gesture or other input to the touch screen display. The user interface 126 may be in communication with the memory 122, communication interface 124, and/or driver control circuitry 128, such as via a bus.

The driver control circuitry 128 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the driver control circuitry 128 is embodied separately from the processor 120, the driver control circuitry 128 may be in communication with the processor 120. The driver control circuitry 128 may further be in communication with one or more of the memory 122, communication interface 124, or user interface 126, such as via a bus.

Figure 4:
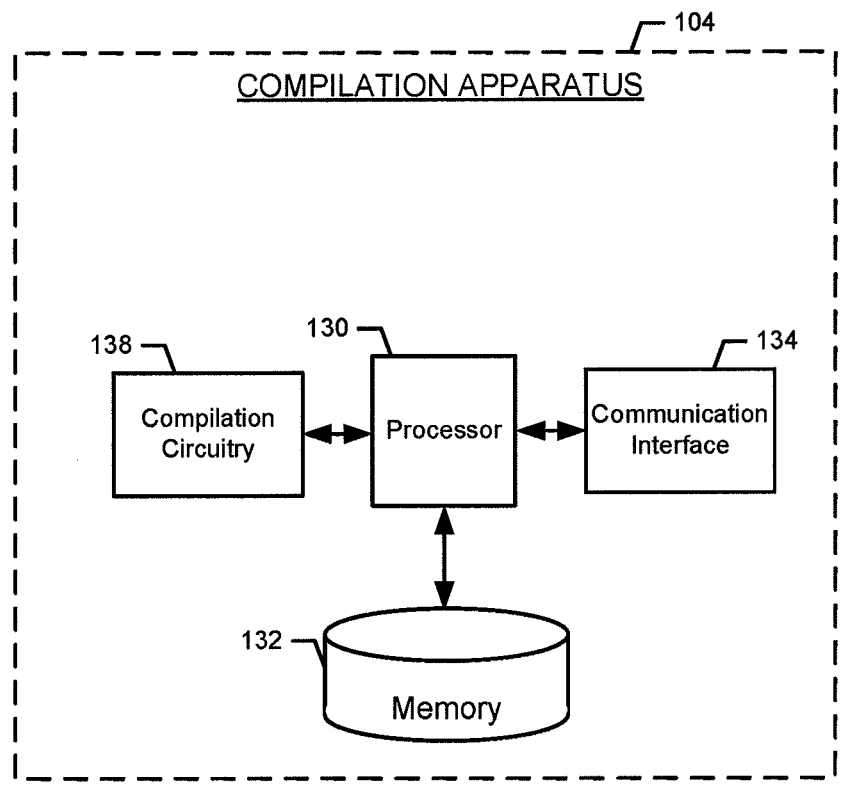
FIG. 4 illustrates a block diagram of a compilation apparatus according to an example embodiment.

Referring now to FIG. 4, FIG. 4 illustrates a more detailed block diagram of a compilation apparatus 104 according to an example embodiment. In the example embodiment, the compilation apparatus 104 includes various means for performing the various functions herein described. These means may comprise one or more of a processor 130, memory 132, communication interface 134, or compilation circuitry 138. The means of the compilation apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 132) that is executable by a suitably configured processing device (for example, the processor 130), or some combination thereof.

In some example embodiments, one or more of the means illustrated in FIG. 4 may be embodied as a chip or chip set. In other words, the compilation apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, communication interface 134, and/or compilation circuitry 138 may be embodied as a chip or chip set. The compilation apparatus 104 may therefore, in some example embodiments, be configured to implement embodiments of the present invention on a single chip or as a single "system on a chip." As another example, in some example embodiments, the compilation apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 130 comprises a plurality of processors. The plurality of processors may be in operative communication with each other and may be collectively configured to perform one or more functionalities of the compilation apparatus 104 as described herein. The plurality of processors may be embodied on a single computing device or distributed across a plurality of computing devices collectively configured to function as the compilation apparatus 104. In some example embodiments, the processor 130 may be configured to execute instructions stored in the memory 132 or otherwise accessible to the processor 130. These instructions, when executed by the processor 130, may cause the compilation apparatus 104 to perform one or more of the functionalities of the compilation apparatus 104 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 4 as a single memory, the memory 132 may comprise a plurality of memories. The plurality of memories may be embodied on a single computing device or may be distributed across a plurality of computing devices collectively configured to function as the compilation apparatus 104. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the compilation apparatus 104 to carry out various functions in accordance with various example embodiments. For example, in some example embodiments, the memory 132 is configured to buffer input data for processing by the processor 130. Additionally or alternatively, the memory 132 may be configured to store program instructions for execution by the processor 130. The memory 132 may store information in the form of static and/or dynamic information. The stored information may, for example, include one or more data resources. This stored information may be stored and/or used by the compilation circuitry 138 during the course of performing its functionalities.

The communication interface 134 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. In an example embodiment, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more remote computing devices. The communication interface 134 may be configured to receive and/or transmit data using any protocol that may be used for communications between computing devices. In this regard, the communication interface 134 may be configured to receive and/or transmit data using any protocol that may be used for transmission of data over a wireless network, wireline network, some combination thereof, or the like by which the compilation apparatus 104 and one or more computing devices or computing resources may be in communication. As an example, the communication interface 134 may be configured to enable communication between the compilation apparatus 104 and the execution apparatus 102 over a network (for example, the network 108). The communication interface 134 may additionally be in communication with the memory 132 and/or compilation circuitry 138, such as via a bus.

The compilation circuitry 138 may be embodied as various means, such as circuitry, hardware, a computer program product comprising computer readable program instructions stored on a computer readable medium (for example, the memory 132) and executed by a processing device (for example, the processor 130), or some combination thereof and, in some embodiments, is embodied as or otherwise controlled by the processor 130. In embodiments wherein the compilation circuitry 138 is embodied separately from the processor 130, the compilation circuitry 138 may be in communication with the processor 130. The compilation circuitry 138 may further be in communication with one or more of the memory 132 or communication interface 134, such as via a bus.

In some example embodiments, a framework may be implemented on the execution apparatus 102. The framework may be configured to handle applications, such as web applications requiring runtime compilation. In this regard, the framework may, in some example embodiments, be configured to handle kernels, such as may be embedded in applications, which may require runtime compilation. However, in some example embodiments, the execution apparatus 102 may not include a compiler for the framework or may include a limited compiler that may not include a full range of compilation capabilities. The framework may comprise a framework for coordinating parallel execution of a compiled executable version of an application requiring runtime compilation across a plurality of heterogeneous processors. In this regard, the framework of some example embodiments may facilitate execution of an application and/or kernel thereof compiled such that the application and/or kernel thereof is targeted to execute in parallel on a particular set of heterogeneous processors and/or other computing resources, which may be implemented on some example embodiments of an execution apparatus 102. In such example embodiments, the framework may comprise an Open Computing Language (OpenCL) implementation, Open Graphics Library (OpenGL) implementation, or the like.

In some example embodiments, the driver control circuitry 128 is configured to implement a driver for a framework implemented on the execution apparatus 102. In this regard, the driver control circuitry 128 may be configured to implement and control functionalities of various example driver embodiments described herein. The driver implemented by the driver control circuitry 128 in accordance with some example embodiments may be configured to provide an application programming interface (API) for the framework.

Figure 5:
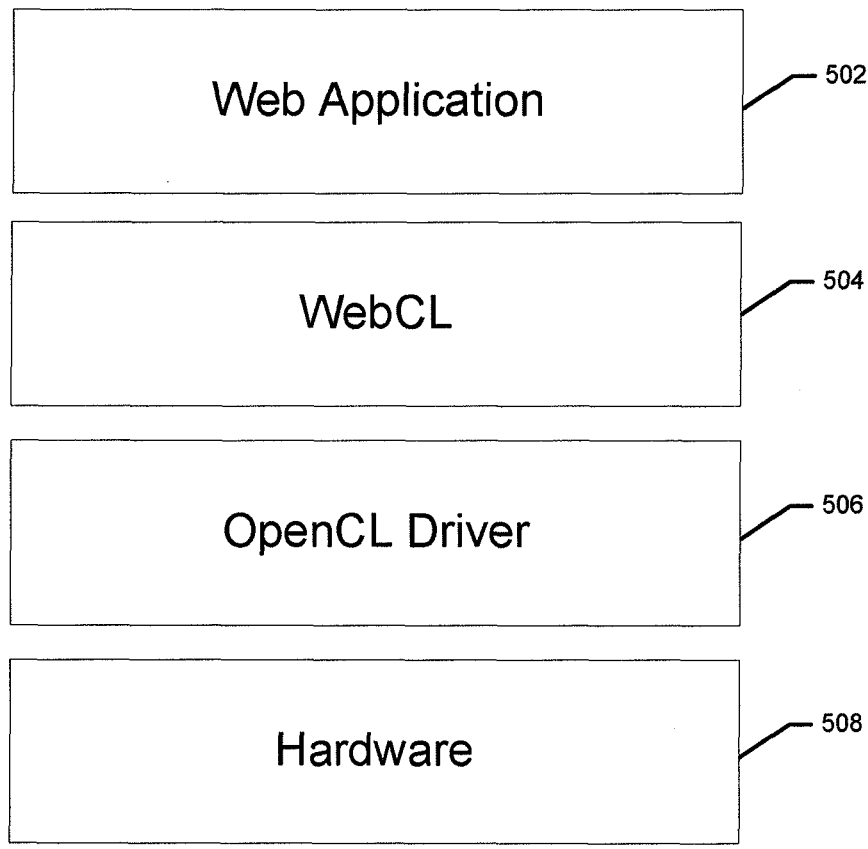
FIG. 5 illustrates an example software stack in accordance with some example embodiments.

In example embodiments wherein the framework comprises an OpenCL™ implementation, the driver control circuitry 128 may be configured to implement an OpenCL™ driver. In this regard, FIG. 5 illustrates an example software stack in accordance with some example embodiments wherein the driver control circuitry 128 is configured to implement an OpenCL™ driver 506. The layer 502 may comprise a web application. The web application may, for example, be implemented using HyperText Markup Language (HTML), Cascading Style Sheets (CSS), JavaScript, WebGL (OpenGL JavaScript bindings), WebCL (OpenCL™ with JavaScript bindings), some combination thereof, and/or the like. As an example, the web application may comprise a WebCL kernel. The web application and/or kernel thereof may, for example, be received by the execution apparatus 102 from an application source 106 via the network 108. The WebCL layer 504 may provide JavaScript or other bindings that may expose OpenCL™ capabilities to the web application layer 502 such that a web application may be implemented on an underlying OpenCL™ framework. The OpenCL™ driver layer 506 may comprise a driver implemented by the driver control circuitry 128 in accordance with some example embodiments. In this regard, the OpenCL™ driver layer 506 may provide an OpenCL driver, which may provide an OpenCL™ API and at least some of the functionality thereof. The hardware layer 508 may comprise an underlying hardware execution platform on which an application, such as the web application layer 502 may execute with the assistance of the OpenCL™ driver layer 506.

It will be appreciated that the example software stack of FIG. 5 is provided by way of example and not by way of limitation. In this regard, other software stacks may be implemented in addition to or in lieu of that illustrated in FIG. 5. Further, it will be appreciated that a driver implemented by the driver control circuitry 128 in accordance with various example embodiments is not limited to being implemented as an OpenCL™ driver. As such, where example embodiments are described herein with reference to OpenCL™, it will be appreciated that OpenCL™ is used for purposes of example. In this regard, other frameworks may be substituted for OpenCL™ within the scope of the disclosure and the driver control circuitry 128 may accordingly be configured to implement drivers for such other frameworks.

A kernel, such as may be included in an application (e.g., a web application), may comprise any function that may be executed, when compiled. In this regard, an OpenCL™ kernel and/or a WebCL kernel may comprise a computation function, which may be described using OpenCL™ C language. As another example, a kernel may comprise an intermediate representation, such as byte code that may require further compilation prior to execution. A driver implemented in accordance with some example embodiments may be configured to receive code (e.g., source code, byte code, and/or the like) for a kernel(s) requiring runtime compilation for execution using a framework implemented on the execution apparatus 102. The code may have been developed independent of knowledge of an execution platform of the execution apparatus 102. The kernel may be received or otherwise accessed by the execution apparatus 102 from an application source 106. As an example, the kernel may be embedded in and/or may otherwise comprise a component of an application, such as a web application, that may be accessed by the execution apparatus 102.

The driver may be further configured to obtain a compiled executable version of the kernel. In this regard, the driver may be configured to obtain a compiled executable that is targeted for execution on an execution platform of the execution apparatus 102. The executable may be in any format that is compatible with a framework (e.g., an OpenCL framework) implemented on the execution apparatus 102 and/or that is otherwise executable on an execution platform of the execution apparatus 102. By way of example, the compiled executable may comprise an executable binary, byte code, optimized code, an intermediate code representation interpretable by the execution platform, and/or the like.

In some example embodiments, the driver may be configured to leverage a remote compiler that may be implemented on the compilation apparatus 104 by the compilation circuitry 138 in order to obtain a compiled executable version of an application. In this regard, the compiler functionality may be at least partially offloaded from the execution apparatus 102 to the compilation apparatus 104 in a thin client mode. Accordingly, such example embodiments may enable execution of kernels requiring runtime compilation even on apparatuses that do not include a compiler or that do not include a full-featured compiler for the framework. As an additional example, some example embodiments wherein the driver is configured to leverage a remote compiler may allow for load balancing between the execution apparatus 102 and compilation apparatus 104, by offloading compilation. As such, in some example embodiments wherein an OpenCL™ framework is implemented on the execution apparatus 102, compiler dependencies for the framework may be at least partially removed by the driver through implementation of a remote compiler on the compilation apparatus 104. In some example embodiments wherein the driver comprises an OpenCL™ driver, the driver may be configured to provide runtime compilation support for OpenCL™ embedded profile through use of a compiler remotely implemented on the compilation apparatus 104. In this regard, the driver may be implemented in conjunction with OpenCL™ embedded profile to provide support for runtime compilation through use of a compiler implemented remotely in a thin client mode.

The driver may be configured to cause a compilation request comprising code (e.g., source code, byte code, some combination thereof, or the like) for a kernel to be sent to the compilation apparatus 104 to enable compilation of the code by the compilation apparatus 104. In addition to the code, the compilation request may comprise information about an execution platform of the execution apparatus 102 that may enable the compilation apparatus 104 to target compilation to generate a compiled executable that is targeted for execution on the execution platform. Accordingly, the information may comprise information about a hardware platform (e.g., the hardware layer 508) of the execution apparatus 102, a capability of a user interface of the execution apparatus 102 (e.g., of the user interface 126), an operating system implemented on the execution platform, a runtime library implemented on the execution platform, a software configuration of the execution platform, a type of the execution apparatus 102, network subscriber information for the execution apparatus 102 or user thereof, network capabilities, network access restrictions, and/or the like. In some example embodiments, the compilation request may additionally or alternatively include information identifying the execution apparatus 102. The identification information may, for example, comprise one or more of a serial number of the execution apparatus 102, a phone number of the execution apparatus 102, an international mobile equipment identity (IMEI) of the execution apparatus 102, a media access control (MAC) address of the execution apparatus 102, a type of the execution apparatus 102 (e.g., make and model), a username of a user (e.g., a username used for accessing a service) of the execution apparatus 102, or the like. The identification information may, for example, enable the compilation apparatus 104 to obtain information about an execution platform of the execution apparatus 102 from one or more information sources 110 to enable targeted compilation of the source code.

The compilation circuitry 138 may be configured to receive a compilation request sent by the execution apparatus 102 and may compile at least a portion of the code contained in the request to generate a compiled executable version of the kernel. The compilation circuitry 138 may target compilation to an execution platform of the execution apparatus 104. In this regard, the compilation circuitry 138 may compile the code based at least in part on information about the execution platform that may be included in the compilation request and/or that may be accessible based at least in part on information included in the compilation request. In some example embodiments wherein the compilation request includes identification information, the compilation circuitry 138 may utilize the identification information to access information about an execution platform of the execution apparatus 102 from one or more information sources 110.

In some example embodiments, the compilation circuitry 138 may be configured to provide code translation or conversion. For example, the compilation circuitry 138 may extend OpenCL C kernel language (and/or other language or framework) support to another language or framework that may be supported by the execution apparatus 102. In this regard, the compilation circuitry 138 may be configured to generate an executable based on another language or framework than that for which the source code was produced. As an example, Java byte code or JavaScript may be generated at least in part through translation or conversion of an OpenCL kernel.

In some example embodiments, the compilation circuitry 138 may be configured to implement security features to provide secure compilation of source code. As an example, the compilation circuitry 138 may utilize sandboxing for compiling code. As another example, the compilation circuitry 138 may execute and/or otherwise test a compiled executable in a secure (e.g., sandboxed) environment for evaluation purposes prior to sending a compiled executable to an execution apparatus 102.

The compilation circuitry 138 may be further configured to cause a compilation response to be sent to the execution apparatus 102. The compilation response may include a compiled executable, which may, for example, be targeted for execution on an execution platform of the execution apparatus 102.

In some example embodiments, the compilation circuitry 138 may maintain a library (e.g., a cache) of pre-compiled kernels, such as in the memory 132. In such example embodiments, the compilation circuitry 138 may be configured to determine whether an appropriate pre-compiled kernel corresponding to code received in a compilation request is available in the library prior to compiling received code. If a pre-compiled kernel is available, the compilation circuitry 138 may send the pre-compiled kernel to the execution apparatus 102 in a compilation response. If, however, the compilation circuitry 138 determines that an appropriate pre-compiled kernel is not available, the compilation circuitry 138 may compile the code.

The driver may receive the compiled executable and may cause the compiled executable to be provided (e.g., returned) for execution on an execution platform of the execution apparatus 102. In this regard, the driver may, for example, provide the compiled executable for execution on the hardware layer 508.

In some example embodiments, the driver may be configured to implement a cache, which may store compiled executable versions of kernels for later use. This cache may, for example, be implemented on the memory 122. In such example embodiments, the driver may cause storage of a compiled executable received in a compilation response for later usage. Further in such example embodiments, when the driver receives code for a kernel requiring at least partial runtime compilation, the driver may determine whether a previously compiled executable version of the kernel is stored in the cache prior to sending a compilation request to the compilation apparatus 104. If a cached version is available, the driver may retrieve the cached version and provide the cached version for execution rather than sending a compilation request to the compilation apparatus 104. However, if a cached version is not available, then the driver may send the code to the compilation apparatus 104 in a compilation request as previously described.

Figure 6:
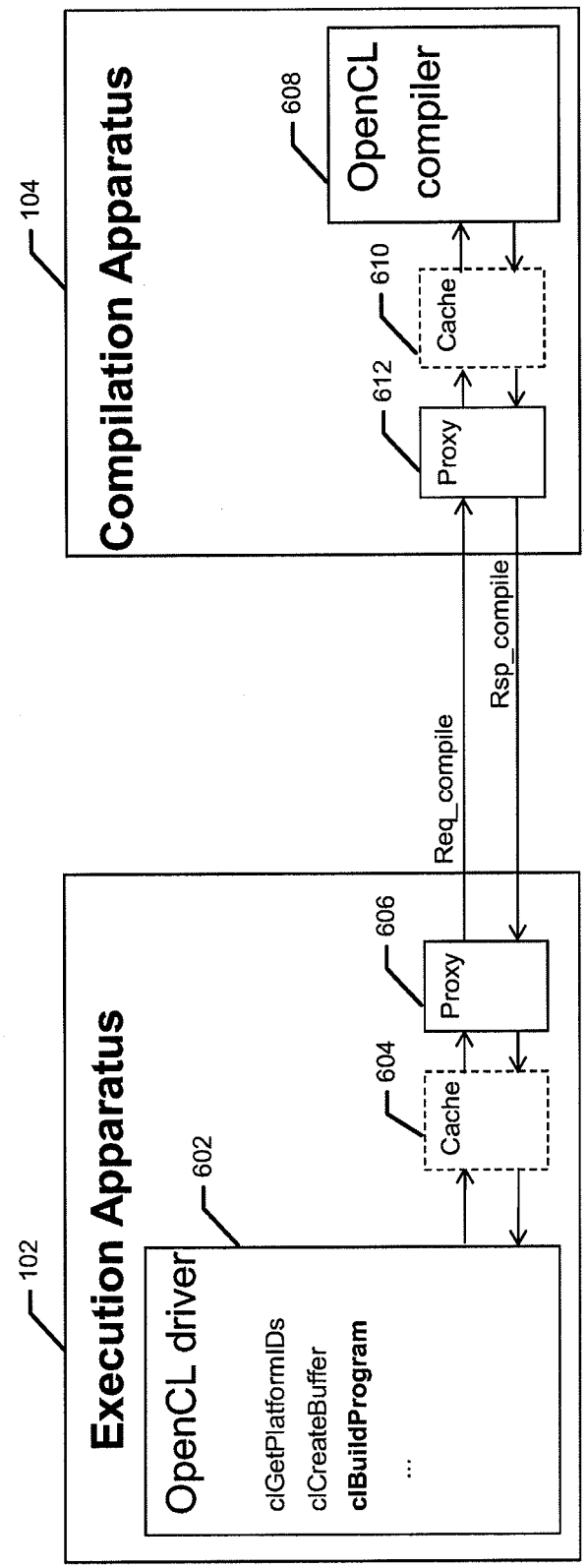
FIG. 6 illustrates a block diagram of a driver framework in accordance with some example embodiments.

Referring now to FIG. 6, FIG. 6 illustrates a block diagram of a driver framework in accordance with some example embodiments. In this regard, FIG. 6 illustrates an example implementation of an OpenCL™ driver framework. In this regard, the driver control circuitry 128 may be configured to implement the OpenCL™ driver 602, which may be configured to perform at least some of the driver functionality described herein. The framework may further include a cache 604, which may be used to store previously compiled executable versions of kernels. A proxy 606 may additionally be implemented to facilitate sending compilation requests to the compilation apparatus 104 and receiving compilation responses from the compilation apparatus 104.

The compilation circuitry 138 may be configured to implement the OpenCL™ compiler 608, which may be configured to compile an OpenCL™ kernel received from the execution apparatus 102. A compilation apparatus 104 implementing the framework of FIG. 6 may further include a cache 610 for storing compiled executables. In this regard, compilation latency may be reduced for future requests by storing previously compiled executables, executables for the most popular applications/web sites, and/or the like. The framework may further include the proxy 612, which may facilitate receiving compilation requests from the execution apparatus 102 and sending compilation responses to the execution apparatus 102.

The OpenCL™ driver 602 may implement a build program function. Pseudo code for the function may, for example, be defined as:

```
1    build_program {
2        # ifdef CACHED
3            if cached {
4                return cached program
5            }
6            else
7        #endif
8        if network_connection_available {
9            compose Req_compile
10           send Req_compile
11           wait for Rsp_compile
12           compose program
13           # ifdef CACHED
14               cache program
15           #endif
16           return program
17       }
18       else {
19           return COMPILER_NOT_AVAILABLE
20       }
21   }
```

The build program function may be more particularly defined, for example in OpenCL™, as:

```
cl_int clBuildProgram ( cl_program program,
    cl_uint num_devices,
    const cl_device_id *device_list,
    const char *options,
    void (CL_CALLBACK *pfn_notify)(cl_program program,
    void *user_data),
    void *user_data),
```

Accordingly, the build program function may determine if a compiled executable version of the program (e.g., the kernel) is already cached (line 2). This determination may, for example, be made by comparing program information in the cache 604 to program information provided as a parameter when the build program function was called. If a compiled executable version of the program is available, it may be returned for execution (line 3).

If, however, a compiled executable version is not available in the cache 604, the build program function may determine if a network connection (e.g., a network connection to the compilation apparatus 104 via the network 108) is available (line 6). If the network connection is available, the kernel source and associated execution platform data may be composed in a compilation request message (Req_compile) and sent to the compilation apparatus 104 (lines 7-8). The execution platform data may include exact platform information for the compilation and/or identification information for the execution apparatus 102) that may enable the OpenCL™ compiler 608 to access execution platform data from an information source 110. After receiving the compilation result in a compilation response, the program object (e.g., the kernel object) may be composed and returned to the calling function (lines 7-12).

The compiled executable may additionally be stored in the cache 604 for later use (line 11). The cache 604 may, for example, store executables from web pages that a user of the execution apparatus 102 visits often. In this regard, rather than again compiling the same code, the previously compiled executable may be accessed from the cache 604. Further, the cache 604 may enable offline usage of the OpenCL™ driver 602, provided that a compiled executable for a given application is stored in the cache 604.

If, however the network connection is not available, a compiler may not be available for compilation of the source code. As such, a COMPILER_NOT_AVAILABLE message may be returned (line 15). In other words, the network connection may enable full OpenCL™ support and without network connection (and if the program is not in cache 604) the driver may return an OpenCL™ error COMPILER_NOT_AVAILABLE. FIG. 7 illustrates a more detailed pseudo code representation of an implementation of a build program function in accordance with some example embodiments.

Some web application may be used offline in accordance with standards providing a browser cache. For example, HTML5 provides HTML5 localStorage and HTML5 application cache functionality. Accordingly, in some example embodiments wherein the driver control circuitry 128 implements a driver that caches compiled executables, the driver may be configured to handle signaling between the browser cache and the executables cache to manage coherency of the caches (e.g., when to flush/keep data in caches). Alternatively, in some embodiments the executables cache may be integrated with or otherwise combined with the browser cache.

The driver of some example embodiments may offload other tasks of a framework driver to the compilation apparatus 102 in addition to the compiler. In this regard, for example, additional aspects of an OpenCL platform may be serialized and passed to the execution apparatus 102 for implementation by the compilation circuitry 138.

Figure 8:
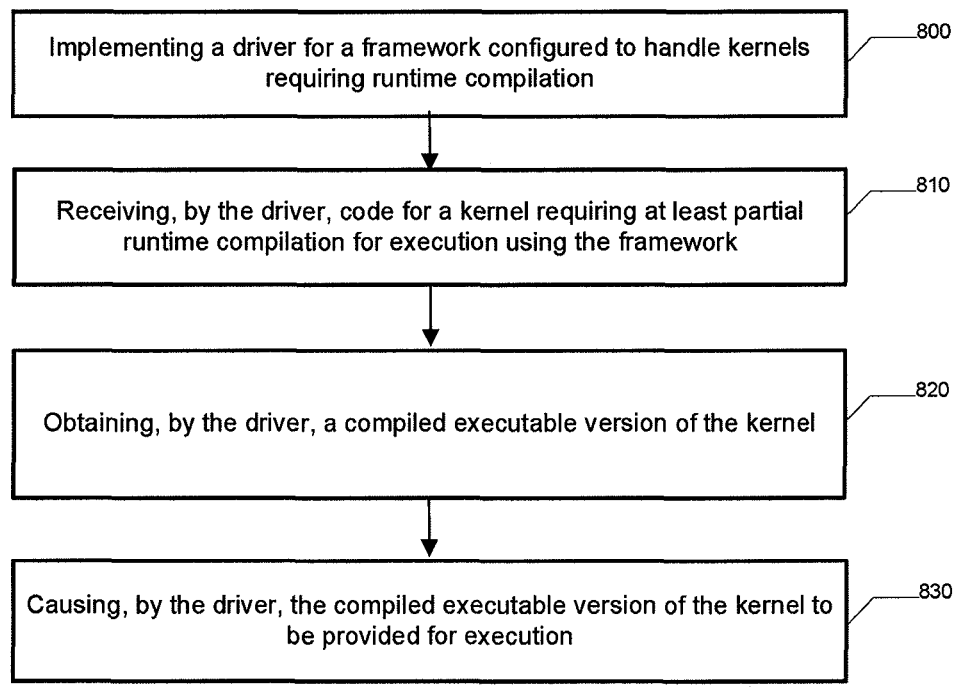
FIG. 8 illustrates a flowchart according to an example method for facilitating execution of applications requiring runtime compilation according to some example embodiments.

FIG. 8 illustrates a flowchart according to an example method for facilitating execution of applications requiring runtime compilation according to some example embodiments. In this regard, FIG. 8 illustrates operations that may be performed at the execution apparatus 102. The operations illustrated in and described with respect to FIG. 8 may, for example, be performed by, with the assistance of, and/or under the control of one or more of the processor 120, memory 122, communication interface 124, user interface 126, or driver control circuitry 128. Operation 800 may comprise implementing a driver for a framework configured to handle kernels requiring runtime compilation. The processor 120, memory 122, communication interface 124, and/or driver control circuitry 128 may, for example, provide means for performing operation 800. Operation 810 may comprise receiving, by the driver, code (e.g., source code, byte code, some combination thereof, or the like) for a kernel requiring runtime compilation for execution using the framework. The code for the kernel may, for example, comprise a portion of an application and may be embedded in a received application. The processor 120, memory 122, communication interface 124, and/or driver control circuitry 128 may, for example, provide means for performing operation 810. Operation 820 may comprise obtaining, by the driver, a compiled executable version of the kernel. The compiled executable version of the kernel may not have been locally compiled. For example, the kernel may have been compiled by a compilation apparatus. The processor 120, memory 122, communication interface 124, and/or driver control circuitry 128 may, for example, provide means for performing operation 820. Operation 830 may comprise causing, by the driver, the compiled executable version of the kernel to be provided for execution. The processor 120, memory 122, and/or driver control circuitry 128 may, for example, provide means for performing operation 830.

Figure 9:
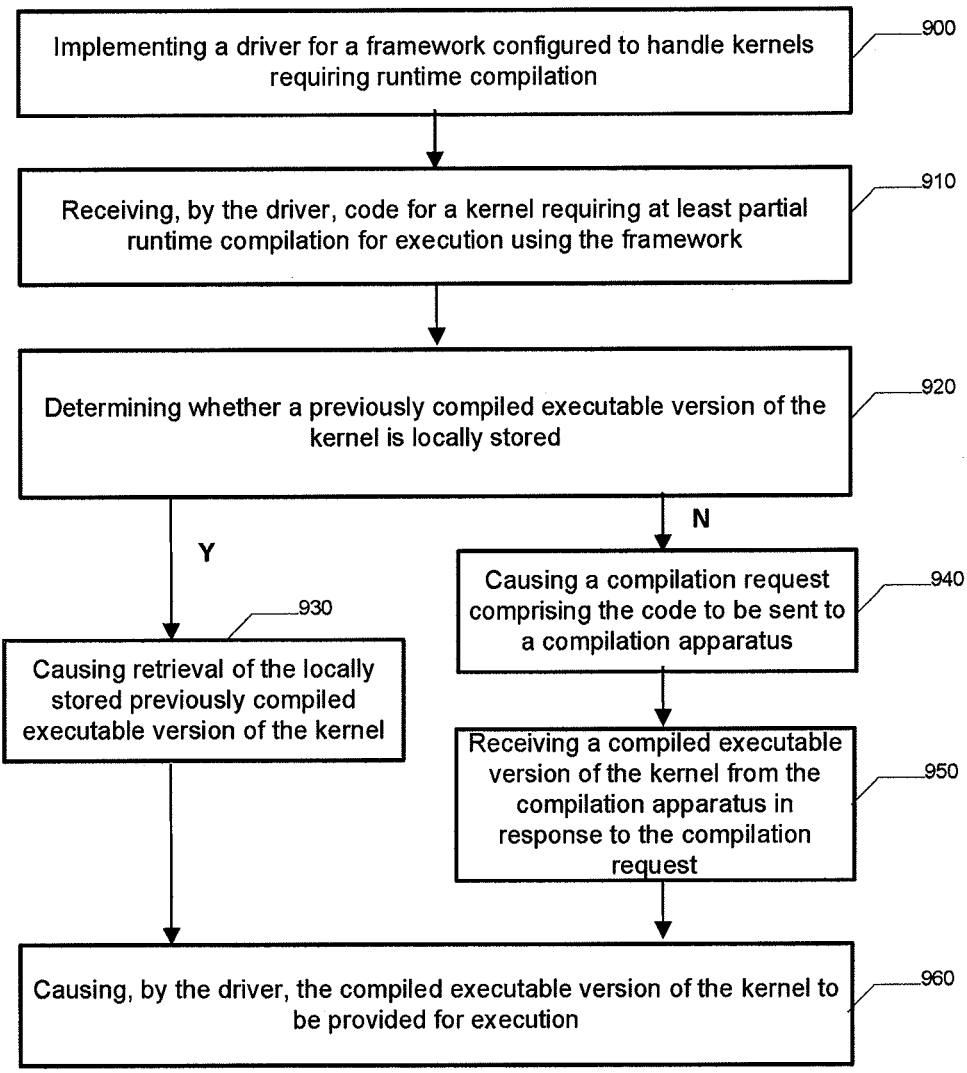
FIG. 9 illustrates a flowchart according to an example method for facilitating execution of applications requiring runtime compilation according to some example embodiments.

FIG. 9 illustrates a flowchart according to another example method for facilitating execution of applications requiring runtime compilation according to some example embodiments. In this regard, FIG. 9 illustrates operations that may be performed at the execution apparatus 102. The operations illustrated in and described with respect to FIG. 9 may, for example, be performed by, with the assistance of, and/or under the control of one or more of the processor 120, memory 122, communication interface 124, user interface 126, or driver control circuitry 128. Operation 900 may comprise implementing a driver for a framework configured to handle kernels requiring runtime compilation. The processor 120, memory 122, communication interface 124, and/or driver control circuitry 128 may, for example, provide means for performing operation 900. Operation 910 may comprise receiving, by the driver, code (e.g., source code, byte code, some combination thereof, or the like) for a kernel requiring at least partial runtime compilation for execution using the framework. The processor 120, memory 122, communication interface 124, and/or driver control circuitry 128 may, for example, provide means for performing operation 910. Operation 920 may comprise the driver determining whether a previously compiled executable version of the kernel is locally stored, such as in a cache maintained by the driver. The processor 120, memory 122, and/or driver control circuitry 128 may, for example, provide means for performing operation 920.

If it is determined in operation 920 that a previously compiled executable version of the kernel is locally stored, operation 930 may comprise the driver causing retrieval of the locally stored previously compiled executable version of the kernel. The previously compiled executable version may, for example, have been previously compiled by a compilation apparatus and cached by the execution apparatus for later use. The processor 120, memory 122, and/or driver control circuitry 128 may, for example, provide means for performing operation 930. If, however, it is determined in operation 920 that a previously compiled executable version of the kernel is not locally stored, operation 940 may comprise the driver causing a compilation request comprising the code to be sent to a compilation apparatus. The processor 120, memory 122, communication interface 124, and/or driver control circuitry 128 may, for example, provide means for performing operation 940. Operation 950 may comprise the driver receiving a compiled executable version of the kernel from the compilation apparatus in response to the compilation request. The processor 120, memory 122, communication interface 124, and/or driver control circuitry 128 may, for example, provide means for performing operation 950. Operation 960 may comprise the driver causing the compiled executable version (e.g., the executable version obtained in operation 930 or in operation 950) of the kernel to be provided for execution. The processor 120, memory 122, and/or driver control circuitry 128 may, for example, provide means for performing operation 960.

Figure 10:
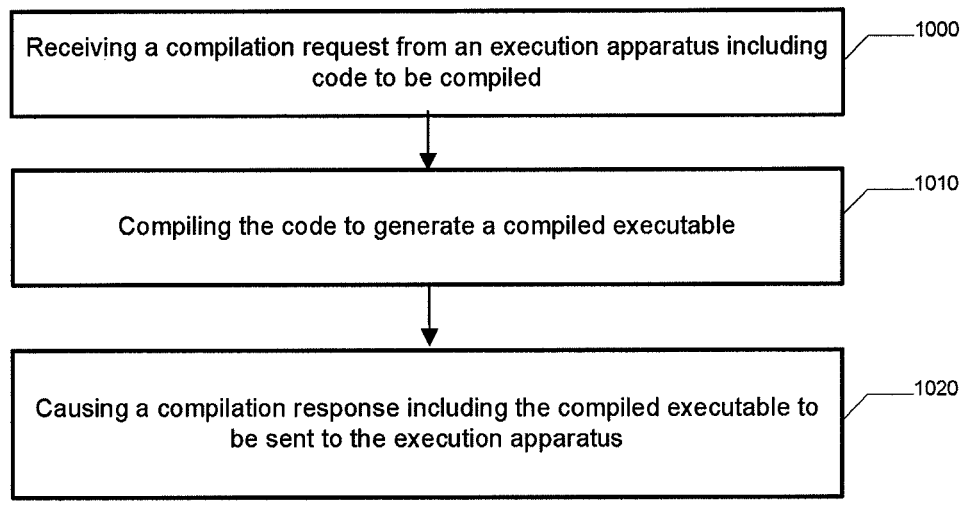
FIG. 10 illustrates a flowchart according to an example method for facilitating execution of applications requiring runtime compilation according to some example embodiments.

FIG. 10 illustrates a flowchart according to an example method for facilitating execution of applications requiring runtime compilation according to an example embodiment. In this regard, FIG. 10 illustrates operations that may be performed at the compilation apparatus 104. The operations illustrated in and described with respect to FIG. 10 may, for example, be performed by, with the assistance of, and/or under the control of one or more of the processor 130, memory 132, communication interface 134, or compilation circuitry 138. Operation 1000 may comprise receiving a compilation request from an execution apparatus including code (e.g., source code, byte code, some combination thereof, or the like) to be compiled. The processor 130, memory 132, communication interface 134, and/or compilation circuitry 138 may, for example, provide means for performing operation 1000. Operation 1010 may comprise compiling the code to generate a compiled executable. The processor 130, memory 132, and/or compilation circuitry 138 may, for example, provide means for performing operation 1010. Operation 1020 may comprise causing a compilation response including the compiled executable to be sent to the execution apparatus. The processor 130, memory 132, communication interface 134, and/or compilation circuitry 138 may, for example, provide means for performing operation 1020.

FIGS. 8-10 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122 and/or in the memory 132) and executed by a processor in the computing device (for example, by the processor 120 and/or by the processor 130). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an execution apparatus 102 and/or a compilation apparatus 104) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an execution apparatus 102 and/or a compilation apparatus 104) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 120 and/or processor 130) may provide all or a portion of the elements. In another embodiment, all or a portion of the elements may be configured by and operate under control of a computer program product. The computer program product for performing the methods of an example embodiment includes a computer-readable storage medium (for example, the memory 122 and/or memory 132), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   implementing, by a processor, a driver for a framework configured to handle kernels requiring runtime compilation, wherein the driver is configured to provide an application programming interface for coordinating parallel execution of a compiled executable version of an application requiring runtime compilation across a plurality of heterogeneous processors;
   receiving, by the driver, code for a kernel requiring at least partial runtime compilation for execution using the framework;

obtaining, by the driver, a compiled executable version of the kernel, wherein the compiled executable version of the kernel was not locally compiled; and causing, by the driver, the compiled executable version of the kernel to be provided for execution.

2. The method of claim 1, wherein obtaining the compiled executable version of the kernel comprises:

causing a compilation request comprising the code to be sent to a remote compilation apparatus; and receiving the compiled executable version of the kernel from the remote compilation apparatus in response to the compilation request.

3. The method of claim 2, further comprising:

determining, by the driver, whether a previously compiled executable version of the kernel is locally stored;

wherein in an instance in which it is determined that a previously compiled executable version of the kernel is locally stored, obtaining the compiled executable version of the kernel comprises causing retrieval of the locally stored kernel; and wherein in an instance in which it is determined that a previously compiled executable version of the kernel is not locally stored, obtaining the compiled executable version of the kernel comprises:

causing the compilation request to be sent to the remote compilation apparatus; and receiving the compiled executable version of the kernel from the remote compilation apparatus.

4. The method of claim 1, wherein obtaining the compiled executable version of the kernel comprises obtaining a compiled executable version of the kernel that is specifically targeted for execution on an execution platform of the apparatus.

5. The method of claim 1, wherein the code for the kernel is received as a component of a web application.

6. The method of claim 1, wherein the framework comprises an Open Computing Language framework.

7. The method of claim 6, wherein the driver is implemented in conjunction with an Open Computing Language embedded profile to provide support for runtime compilation through use of a compiler implemented remotely in a thin client mode.

8. The method of claim 1, wherein the kernel comprises an Open Computing Language kernel.

9. An apparatus comprising at least one processor and at least one memory storing computer program code, wherein the at least one memory and stored computer program code are configured, with the at least one processor, to cause the apparatus to at least:

implement a driver for a framework configured to handle kernels requiring runtime compilation, wherein the driver is configured to provide an application programming interface for coordinating parallel execution of a compiled executable version of an application requiring runtime compilation across a plurality of heterogeneous processors;

receive, by the driver, code for a kernel requiring at least partial runtime compilation for execution using the framework;

obtain, by the driver, a compiled executable version of the kernel, wherein the compiled executable version of the kernel was not locally compiled; and cause, by the driver, the compiled executable version of the kernel to be provided for execution.

10. The apparatus of claim 9, wherein the at least one memory and stored computer program code are configured, with the at least one processor, to cause the apparatus to obtain the compiled executable version of the kernel at least in part by:

causing a compilation request comprising the code to be sent to a remote compilation apparatus; and receiving the compiled executable version of the kernel from the remote compilation apparatus in response to the compilation request.

11. The apparatus of claim 9, wherein the at least one memory and stored computer program code are configured, with the at least one processor, to further cause the apparatus to:

determine, by the driver whether a previously compiled executable version of the kernel is locally stored;

wherein in an instance in which it is determined that a previously compiled executable version of the kernel is locally stored, obtain the compiled executable version of the kernel at least in part by causing retrieval of the locally stored kernel; and wherein in an instance in which it is determined that a previously compiled executable version of the kernel is not locally stored, obtain the compiled executable version of the kernel at least in part by:

causing the compilation request to be sent to the remote compilation apparatus; and receiving the compiled executable version of the kernel from the remote compilation apparatus.

12. The apparatus of claim 9, wherein the at least one memory and stored computer program code are configured, with the at least one processor, to further cause the apparatus to obtain the compiled executable version of the kernel by obtaining a compiled executable version of the kernel that is specifically targeted for execution on an execution platform of the apparatus.

13. The apparatus of claim 9, wherein the code for the kernel is received as a component of a web application.

14. The apparatus of claim 9, wherein the framework comprises an Open Computing Language framework.

15. The apparatus of claim 14, wherein the driver is implemented in conjunction with Open Computing Language embedded profile to provide support for runtime compilation through use of a compiler implemented remotely in a thin client mode.

16. The apparatus of claim 9, wherein the kernel comprises an Open Computing Language kernel.

17. The apparatus of claim 9, wherein the apparatus comprises or is embodied on a mobile phone, the mobile phone comprising user interface circuitry and user interface software stored on one or more of the at least one memory; wherein the user interface circuitry and user interface software are configured to:

facilitate user control of at least some functions of the mobile phone through use of a display; and cause at least a portion of a user interface of the mobile phone to be displayed on the display to facilitate user control of at least some functions of the mobile phone.

18. A computer program product comprising at least one non-transitory computer-readable medium having computer-readable program instructions stored therein, the computer-readable program instructions comprising program instructions configured to cause an apparatus to perform a method comprising:

implementing a driver for a framework configured to handle kernels requiring runtime compilation, wherein the driver is configured to provide an application programming interface for coordinating parallel execution of a compiled executable version of an application requiring runtime compilation across a plurality of heterogeneous processors;

receiving, by the driver, code for a kernel requiring at least partial runtime compilation for execution using the framework;

obtaining, by the driver, a compiled executable version of the kernel, wherein the compiled executable version of the kernel was not locally compiled; and causing, by the driver, the compiled executable version of the kernel to be provided for execution.

* * * * *